United States Patent
Johansson et al.

(10) Patent No.: US 11,813,913 B2
(45) Date of Patent: Nov. 14, 2023

(54) METHOD FOR DETERMINING A DESIRED SPEED OF A VEHICLE

(71) Applicant: Volvo Truck Corporation, Gothenburg (SE)

(72) Inventors: Per Johansson, Gothenburg (SE); Thomas Andersson, Onsala (SE); Anders Petersson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 650 days.

(21) Appl. No.: 17/045,476

(22) PCT Filed: Apr. 6, 2018

(86) PCT No.: PCT/EP2018/025098
§ 371 (c)(1),
(2) Date: Oct. 5, 2020

(87) PCT Pub. No.: WO2019/192671
PCT Pub. Date: Oct. 10, 2019

(65) Prior Publication Data
US 2021/0023903 A1    Jan. 28, 2021

(51) Int. Cl.
| | | |
|---|---|---|
| *B60G 17/016* | (2006.01) | |
| *B60G 17/0165* | (2006.01) | |
| *B60G 17/052* | (2006.01) | |
| *B60G 17/08* | (2006.01) | |
| *G08G 1/00* | (2006.01) | |

(52) U.S. Cl.
CPC ..... *B60G 17/0164* (2013.01); *B60G 17/0165* (2013.01); *B60G 17/052* (2013.01);
(Continued)

(58) Field of Classification Search
CPC ............ B60G 17/0164; B60G 17/0165; B60G 17/0195; B60G 17/052; B60G 17/08;
(Continued)

(56) References Cited

U.S. PATENT DOCUMENTS

| | | | |
|---|---|---|---|
| 4,634,142 A | 1/1987 | Woods et al. | |
| 2008/0251307 A1* | 10/2008 | Bell | B60W 40/064 180/170 |

(Continued)

FOREIGN PATENT DOCUMENTS

| | | |
|---|---|---|
| CN | 1697905 A | 11/2005 |
| CN | 101835642 A | 9/2010 |

(Continued)

OTHER PUBLICATIONS

International Search Report and Written Opinion for International Application No. PCT/EP2018/025098, dated Dec. 21, 2018, 11 pages.

(Continued)

*Primary Examiner* — Charles J Han
(74) *Attorney, Agent, or Firm* — Withrow & Terranova, PLLC

(57) ABSTRACT

The present invention relates to a method for determining a desired speed of a vehicle (1), preferably an autonomous vehicle. The vehicle comprises a shock absorber arrangement (2), preferably an hydraulic shock absorber arrangement, having an elastic hysteresis. The method comprises—obtaining (501) a reference value indicative of the energy dissipated by the shock absorber arrangement (2) in a reference driving condition of a vehicle and—determining (502) a speed of the vehicle for which the value indicative of the energy dissipated by the shock absorber arrangement (2) in a similar driving condition is expected to fall within a predetermined energy dissipation range, using said reference value.

10 Claims, 7 Drawing Sheets

(52) U.S. Cl.
CPC .............. *B60G 17/08* (2013.01); *G08G 1/22* (2013.01); *B60G 2202/152* (2013.01); *B60G 2202/24* (2013.01); *B60G 2400/10* (2013.01); *B60G 2400/204* (2013.01); *B60G 2400/60* (2013.01); *B60G 2800/166* (2013.01)

(58) Field of Classification Search
CPC .......... B60G 2202/152; B60G 2202/24; B60G 2400/10; B60G 2400/102; B60G 2400/204; B60G 2400/252; B60G 2400/60; B60G 2600/02; B60G 2600/044; B60G 2800/16; B60G 2800/166; B60G 2800/70; B60G 2800/80; B60G 2800/982; B60K 31/04; B60W 2300/12; B60W 2422/40; B60W 2510/22; B60W 2720/10; B60W 30/143
See application file for complete search history.

(56) References Cited

U.S. PATENT DOCUMENTS

| | | | |
|---|---|---|---|
| 2013/0144489 | A1 | 6/2013 | Galasso et al. |
| 2016/0031444 | A1* | 2/2016 | Fairgrieve ............. B60W 40/04 701/93 |
| 2018/0273044 | A1* | 9/2018 | Son ....................... B60W 40/06 |

FOREIGN PATENT DOCUMENTS

| | | |
|---|---|---|
| CN | 102481821 A | 5/2012 |
| CN | 103153745 A | 6/2013 |
| DE | 102014008461 A1 | 12/2015 |
| EP | 3093170 A1 | 11/2016 |
| EP | 3173306 A1 | 5/2017 |
| WO | 2015/053681 A1 | 4/2015 |

OTHER PUBLICATIONS

International Preliminary Report on Patentability for International Application No. PCT/EP2018/025098, dated Jun. 23, 2020, 14 pages.
First Office Action for Chinese Patent Application No. 201880092157.8, dated Aug. 1, 2023, 14 pages.

* cited by examiner

METHOD FOR DETERMINING A DESIRED SPEED OF A VEHICLE

This application is a 35 USC 371 national phase filing of International Application No. PCT/EP2018/025098, filed Apr. 6, 2018, the disclosure of which is incorporated herein by reference in its entirety.

TECHNICAL FIELD

The invention relates to a method for determining a desired speed of a vehicle, preferably an autonomous vehicle. The vehicle comprises a shock absorber arrangement, preferably a hydraulic shock absorber arrangement, having an elastic hysteresis. The invention further relates to a system for determining a desired speed of a vehicle, a vehicle comprising such a system, a computer program, and a computer readable medium.

The invention can be applied in heavy-duty vehicles, such as trucks, buses and construction equipment. Although the invention will be described with respect to a truck, the invention is not restricted to this particular vehicle, but may also be used in other vehicles such as a bus or working machine.

BACKGROUND OF THE INVENTION

In a vehicle, in particular an autonomous vehicle, there is a need to determine a desired speed of the vehicle, taking characteristics of the surface of the road at which the vehicle is driving into account. A thus determined desired speed may be communicated to a driver or may be used to for automatic speed control of the vehicle.

To assess the characteristics of the surface of the road at which the vehicle is driving, it is known to utilize data obtained from a shock absorber arrangement. In low, medium and heavy duty vehicles, shock absorber arrangements are commonly mounted between the wheel axle and the vehicle chassis in order to absorb or at least damp the vibrations caused by, for example, the surface of the road at which the vehicle is driving. Typically, the shock absorber may be arranged between a spring suspension and e.g. the wheel axle or the chassis of the vehicle.

US 2008251307 describes a speed adjustment method in which the amplitude of the deflection of a shock absorber is determined, and wherein the speed of the vehicle is controlled on the basis of the thus determined amplitude.

WO 15053681 describes a speed adjustment method in which the speed of the vehicle may be controlled on the basis of one or more of a plurality of parameters. For instance, the speed may be controlled on the basis of detected vibrations of a shock absorber. The vibrations may be measured using a distance sensor measuring the distance between various parts of the vehicle or an accelerometer detecting vehicle movements.

As such, it would be desirable to provide an improved method for determining a desired speed of a vehicle.

SUMMARY OF THE INVENTION

An object of the invention is to provide a method for determining a desired speed of the vehicle, taking the characteristics of the surface of the road at which the vehicle travels into account.

This object is achieved by a method according to claim 1.

As such, the present invention relates to method for determining a desired speed of a vehicle, preferably an autonomous vehicle. The vehicle comprises a shock absorber arrangement, preferably a hydraulic shock absorber arrangement, having an elastic hysteresis. Further the method comprises obtaining a reference value indicative of the energy dissipated by the shock absorber arrangement in a reference driving condition of a vehicle, and determining a speed of the vehicle for which the value indicative of the energy dissipated by the shock absorber arrangement in a similar driving situation is expected to fall within a predetermined energy dissipation range, using said reference value According to the present invention, the desired speed is determined based on consideration of the energy dissipated by the shock absorber arrangement. The energy dissipated by a shock absorber arrangement is speed dependent, and may hence be limited by adjusting the driving speed of the vehicle. Further, considering the energy dissipated by the shock absorber arrangement may be relevant for different considerations, such as assessing the risk for possible damages to one or more components to the vehicle, or limiting the impact from an uneven road surface on the cargo, driver or passengers of the vehicle.

In the predetermined energy dissipation range the value indicative of the energy dissipation may for example be lower than a first threshold value, and/or higher than a second threshold value.

The first and/or second threshold value(s) may be different from the reference value.

The reference driving condition may advantageously be that the vehicle travels over a reference portion of a road. In this case, the similar driving condition may for example be that a vehicle travels a continued portion of the same road, where it may be assumed that the characteristics of the road surface are similar to the characteristics of the road surface of the reference portion. Optionally, the similar driving condition may be the that a vehicle travels over the same reference portion of the road.

Optionally, the step of obtaining the value indicative of the energy dissipated by the shock absorber arrangement comprises, under a load cycle, determining a first set of accelerations or loads for one or more displacements of the shock absorber arrangement when the shock absorber arrangement is compressed; determining a second set of accelerations or loads for the one or more displacements of the shock absorber arrangement when the shock absorber arrangement is expanded; and determining the value indicative of the energy dissipated by the shock absorber arrangement using a difference between the second set of accelerations or loads and/or displacements and the first set of accelerations or loads and/or displacements.

Optionally, the step of obtaining a reference value indicative of the energy dissipated by the shock absorber arrangement in a reference driving condition of a vehicle is performed for a first vehicle, and the step of determining a speed of the vehicle such that a value indicative of the energy dissipated by the shock absorber arrangement in a similar driving condition falls within a predetermined energy dissipation is performed for a second vehicle expected to travel along the same route as the first vehicle. In this variant, the first vehicle may be a leading vehicle and the second vehicle may be a trailing vehicle in a vehicle platoon.

Optionally, the steps of the method are performed for the same vehicle.

Optionally, the method comprises giving an indication of said determined speed to a driver of the vehicle.

Optionally, the method comprising controlling the vehicle to said determined speed.

Optionally, the shock absorber arrangement is connected to a vehicle spring arrangement, and the step of determining the predetermined energy dissipation range comprises: obtaining a characteristic of the vehicle spring arrangement, and determining the predetermined energy dissipation range based on the characteristic of the vehicle spring arrangement.

Optionally, the method further comprises a step of determining the predetermined energy dissipation range comprising: obtaining a frequency level of the shock absorber arrangement; and determining the predetermined energy dissipation range based on the frequency level.

A second aspect of the invention relates to a system for determining a desired speed of a vehicle, preferably an autonomous vehicle, said vehicle comprising a shock absorber arrangement, preferably a hydraulic shock absorber arrangement, having an elastic hysteresis, the system being configured to
- obtain a reference value indicative of the energy dissipated by the shock absorber arrangement in a reference driving condition of a vehicle and
- determine a speed of the vehicle for which a value indicative of the energy dissipated by the shock absorber in a similar driving condition is expected to fall within a predetermined energy dissipation range, using the reference value.

Optionally, the system may be configured to obtain the value indicative of the energy dissipated by the shock absorber arrangement so as to
- determine a first set of accelerations or loads for one or more predetermined displacements of the shock absorber when the shock absorber is compressed;
- determine a second set of accelerations or loads for the one or more predetermined displacements of the shock absorber when the shock absorber is thereafter expanded; and
- determine the value indicative of the energy dissipated by the shock absorber using a difference between the second set of accelerations or loads and the first set of accelerations or loads.

Optionally, the system may be further configured to indicate said determined speed to a driver of the vehicle, or alternatively further configured to control the vehicle to said determined speed.

Optionally, the system may comprise a control unit configured to perform the steps of the system.

In a third aspect, the present invention relates to a vehicle preferably a heavy duty vehicle such as a truck, preferably an autonomous vehicle comprising a system in accordance with the invention.

In a fourth aspect, the present invention relates to a computer program comprising program code means for performing the steps of the method according to the invention when said program is run on a computer.

In a fifth aspect, the present invention relates to a computer readable medium carrying a computer program comprising program means for performing the steps of the method according to the invention when said program means is run on a computer.

It will be understood that features and advantages described herein in relation to the first aspect of the invention are equally applicable to the second, third, fourth and fifth aspects of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF PREFERRED EMBODIMENTS

The invention will be described below for a vehicle in the form of a truck 1 such as the truck illustrated in FIG. 1. The truck 1 should be seen as an example of a vehicle which could comprise a shock absorber arrangement 100 having an elastic hysteresis. A vehicle 1 may comprise one or more shock absorber arrangements 100.

However, the present invention may be implemented in a plurality of different types of vehicles. Purely by way of example, the present invention could be implemented in a truck, a tractor, a car, a bus, a work machine such as a wheel loader or an articulated hauler, or any other type of construction equipment.

Figure 1:
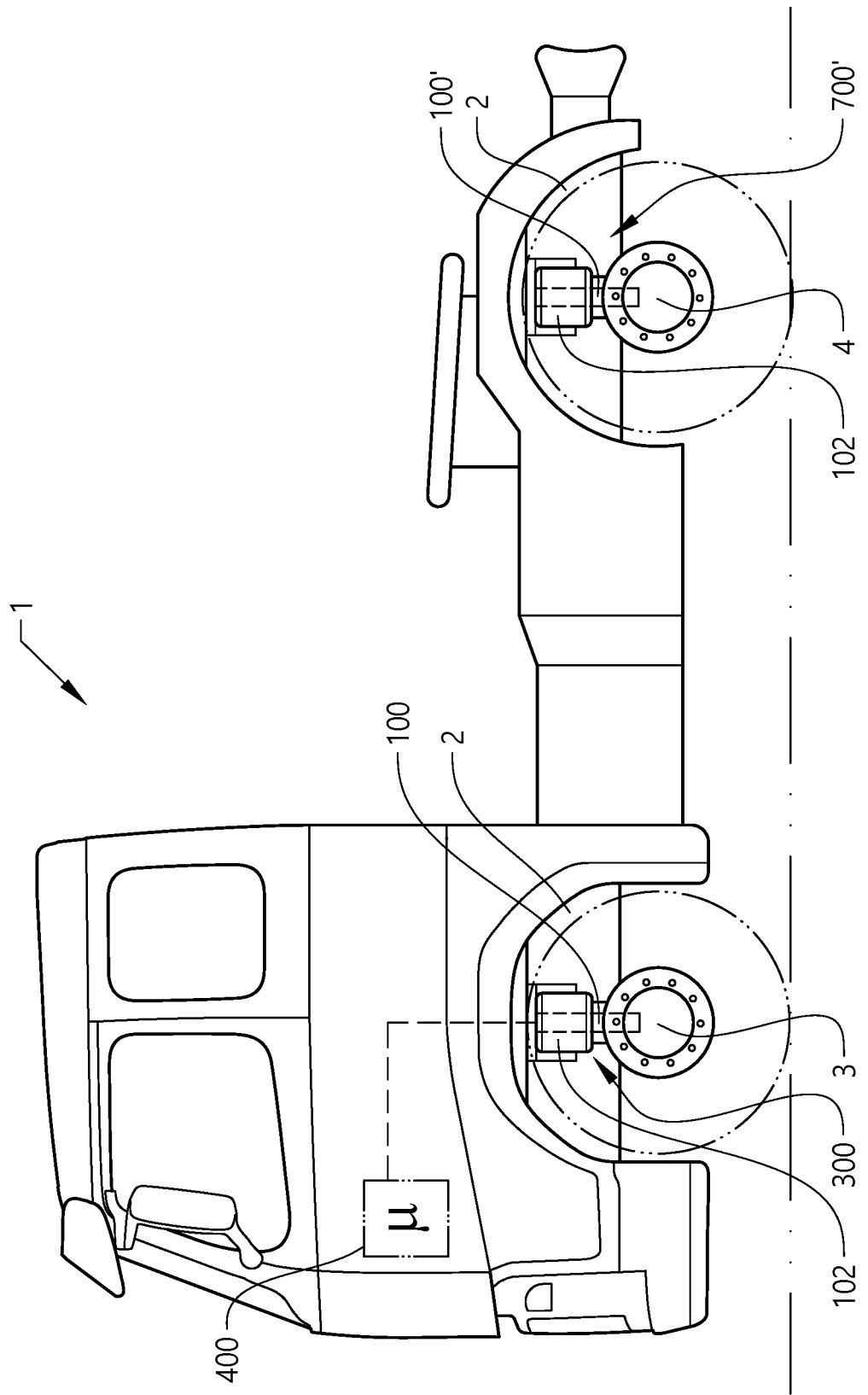
FIG. 1 is a schematic view of a vehicle.

With particular reference to FIG. 1, an example of a vehicle for which the invention may be implemented is described.

In FIG. 1, the vehicle 1 comprises a front vehicle suspension arrangement 300 connecting the frame 2 to the front wheel axle 3, and a rear vehicle suspension arrangement 300' connecting the frame 2 to the rear wheel axle 4. Hence, each of the vehicle suspension arrangement 300, 300' is arranged to damp/absorb loads from the respective wheel axles during motion of the vehicle 1. The vehicle 1 may of course comprise more than two wheel axles. For simplicity, reference is only made to the front vehicle suspension arrangement 300, which is referred to as the vehicle suspension arrangement 300.

As can be seen in FIG. 1, the vehicle suspension arrangement 300 comprises a vehicle shock absorber arrangement 100 and a spring arrangement, here illustrated as comprising a flexible bellows 102 into which gas, such as air, can be added or drained. Other spring arrangements are of course conceivable such as a leaf spring arrangement, etc. In further detail, the vehicle shock absorber arrangement 100 is connected between the wheel axle 3 and the flexible bellows 102, whereby the flexible bellows is connected to the frame 2. Hence, the flexible bellows 102 is connected between the vehicle shock absorber arrangement 100 and the frame 2.

The vehicle 1 further comprises a control unit 400 arranged to receive control signals and deliver control signals for determining a desired speed of the vehicle utilizing a value indicative of the energy dissipated by the shock absorber arrangement 100 as will be described below. Although the control unit 400 is depicted as only being arranged in connection with the vehicle shock absorber arrangement 100 of the front wheel axle 3, it should be readily understood that the control unit is, or may be, arranged in connection with each of the shock absorber arrangements of the vehicle 1.

The control unit 400 may include a microprocessor, microcontroller, programmable digital signal processor or another programmable device. The control unit may also, or instead, include an application specific integrated circuit, a programmable gate array or programmable array logic, a programmable logic device, or a digital signal processor.

Where the control unit includes a programmable device such as the microprocessor, microcontroller or programmable digital signal processor mentioned above, the processor may further include computer executable code that controls operation of the programmable device.

Figure 2:
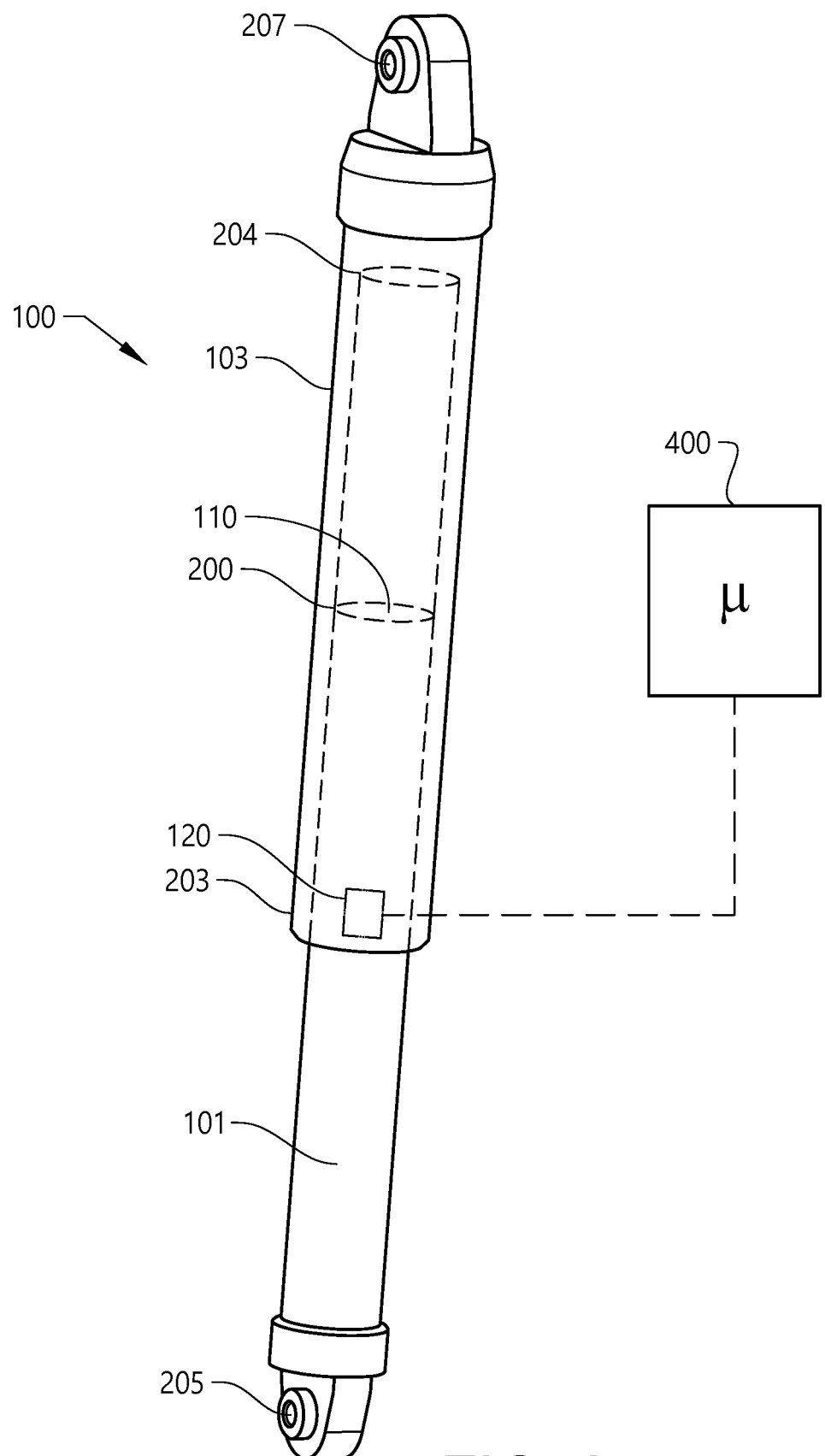
FIG. 2 is a perspective view of an embodiment of a shock absorber.

With reference to FIG. 2, an illustrative example of a vehicle shock absorber arrangement 100 in FIG. 1 is depicted in further detail. As can be seen, the vehicle shock absorber arrangement 100 comprises an upper connecting portion 207 arranged for connection to the flexible bellows 102 depicted in FIG. 1, and a lower connecting portion 205 arranged for connection to the wheel axle. It should be readily understood that the vehicle shock absorber arrangement 100 must not be directly connected to the wheel axle, as a bracket or other component may be arranged between the shock absorber arrangement 100 and the wheel axle.

Furthermore, the shock absorber arrangement 100 comprises a shock absorber housing 103 and a piston 101 movable relative the shock absorber housing 103. As can be seen, the piston 101 is movable within the shock absorber housing 103, whereby the portion of the piston 101 arranged within the shock absorber housing 103 is illustrated with dashed lines. The shock absorber arrangement 100 is schematically illustrated and the skilled person understands that variations in design are conceivable. As is further depicted in FIG. 2, the shock absorber housing 103 comprises piston end positions 203, 204. In detail, the shock absorber housing 103 comprises an upper piston end position 204 and a lower piston end position 203. An end portion 110 of the piston 101 is thus movable within the shock absorber housing between the upper 204 and lower 203 piston end positions. Moreover, the position of the piston 101 within the shock absorber housing at vehicle stand still is denoted as 200 in FIG. 2. Hence, when the engine of the vehicle is turned on and the vehicle is standing still, ready for take off, the end portion 110 of the piston 101 is arranged at the position, denoted as the first position 200 within the shock absorber housing, which position is used in the examples described below in relation to the description of FIGS. 3-4. The position of the end portion of the piston 101 may be determined e.g. by a piston position sensor 120.

Figure 3:
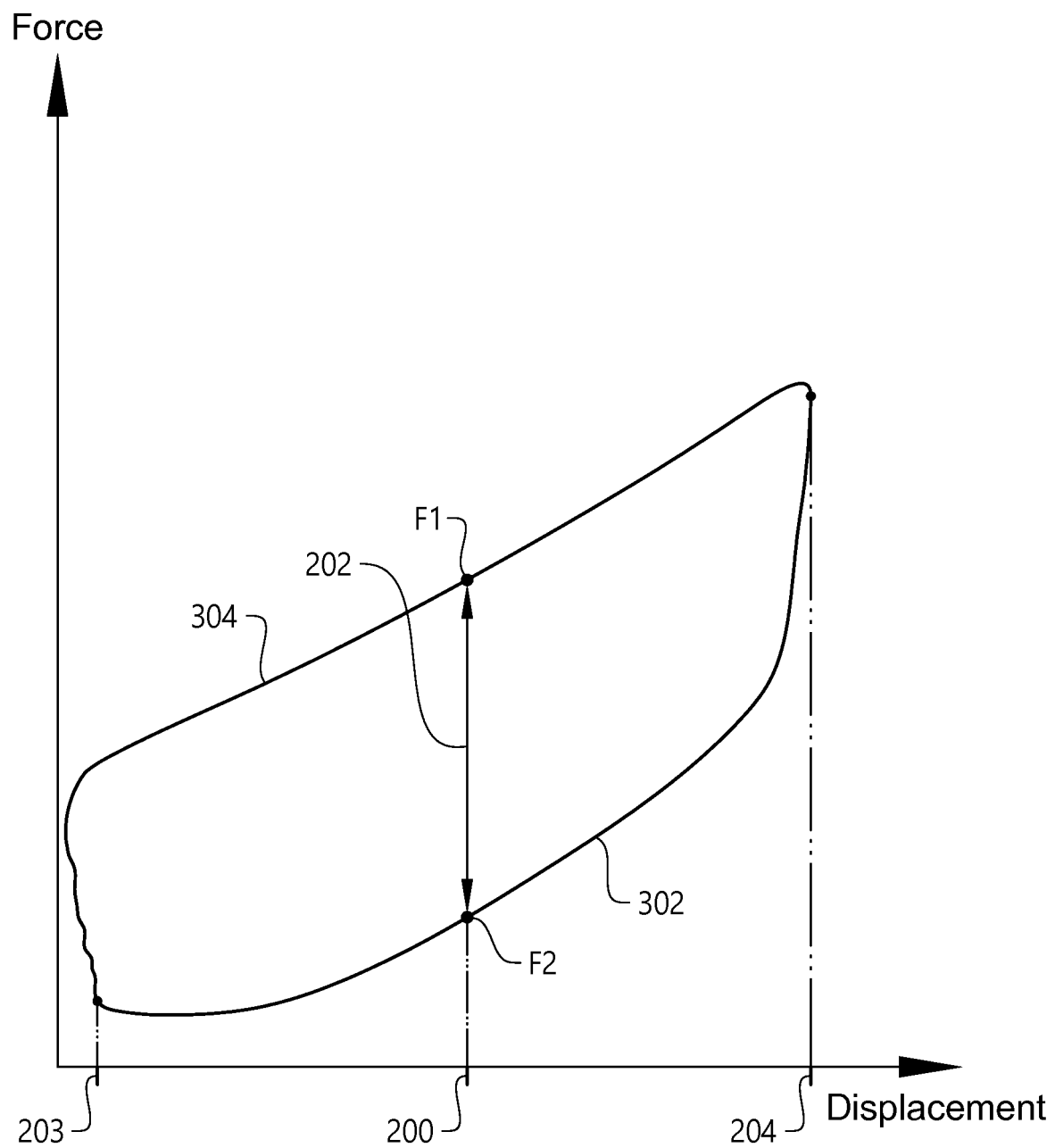
FIG. 3 an example of a diagram of the load characteristics of a shock absorber connected to an air spring for a selected air spring pressure.

Reference is firstly made to FIG. 3, which is a graph illustrating the load characteristic of the shock absorber arrangement 100 connected to a spring arrangement according to a first example embodiment. As can be seen in FIG. 3, the horizontal axis represents the displacement of the piston 101 within the shock absorber housing 103, while the vertical axis represents the force levels of the external force exposed to the shock absorber arrangement 100. The graph in FIG. 3 thus illustrates an example embodiment of the force/displacement characteristics of the shock absorber arrangement during compression and expansion of the shock absorber arrangement 100. In detail, FIG. 3 illustrates the upper 204 and lower 203 piston end positions, and the first position 200 of the piston. Hence, line 302 from the upper piston end position 204 to the lower piston end position 203 represents the movement of the piston 101 from the upper piston end position 204 to the lower piston end position 203, i.e. expansion 302 of the shock absorber arrangement 100. Line 304 from the lower piston end position 203 to the upper piston end position 204 on the other hand represents the movement of the piston 101 from the lower piston end position 203 to the upper piston end position 204, i.e. compression 304 of the shock absorber arrangement 100. As can be seen, the force values are higher for a given displacement during compression in comparison to expansion of the shock absorber arrangement 100 when connected to the spring arrangement.

During operation, i.e. when the shock absorber arrangement 100 is exposed to loading from the vehicle 1, a first force value F1 of the shock absorber arrangement 100 is determined when the piston 101 is arranged at the first position 200 in the compression stage. A second force value F2 of the shock absorber arrangement 100 is also determined when the piston 101 is arranged at the first position 200 in the expansion stage. Hence, the first F1 and second F2 force values are determined for substantially the same piston position within the shock absorber housing 103 during compression and during expansion of the shock absorber arrangement 100 (i. e. during a load cycle). A difference 202 between the first F1 and second F2 force values can thereafter be determined. Hereby, the hysteresis effect of the shock absorber arrangement can be determined, i.e. how much the force differs during compression in comparison to expansion.

FIG. 3 illustrates a first F1 and a second F2 force value for a single position 200 of the shock absorber arrangement 100. It should however be readily understood that the force values of each position from the lower piston end position 203 to the upper piston end position 204 may be acquired and evaluated.

The difference 202 between the first F1 and second F2 force values, i.e. the hysteresis, may then be used as a value indicative of the energy dissipated by the shock absorber, while driving. Preferably, the value indicative of the energy dissipated by the shock absorber may be based on a difference between a first set of acceleration or loads for predetermined displacements of the shock absorber when the shock absorber is compressed, and a second set of acceleration or loads for predetermined displacements of the shock absorber when the shock absorber is thereafter expanded.

The value indicative of the energy dissipated by the shock absorber is compared to a predetermined energy dissipation range. The predetermined energy dissipation may be based on a previously determined characteristic of the vehicle spring arrangement, for example it may be made on measurements of force/acceleration versus displacement curves as described in the above. The predetermined energy dissipation range may be set with various objects in mind, such as limiting wear of the shock absorber arrangement and/or other vehicle parts, or limiting the impacts resulting when travelling on an uneven road surface on the cargo, the driver, and/or the passengers of the vehicle.

The force/acceleration displayed by the vehicle spring arrangement, and the energy dissipated by the vehicle spring arrangement when traveling on an uneven road surface will be dependent on the speed with which the vehicle travels over the road surface.

According to the invention, a desired speed of the vehicle is to be determined, for which speed the value indicative of the energy dissipated by the shock absorber arrangement is expected to fall within the predetermined energy dissipation range.

Hence, the speed of the vehicle may be adjusted so as to e.g. limit wear of the shock absorber arrangement and/or other vehicle parts, or limit the impacts resulting when travelling on an uneven road surface on the cargo, the driver, and/or the passengers of the vehicle.

The hysteresis effect described in the above may however also depend on the characteristic of the spring arrangement connected to the shock absorber arrangement 100. Thus, the hysteresis effect may depend on the gas pressure level within a flexible bellows connected to the shock absorber arrangement 100, or the vertical displacement of a leaf spring arrangement connected to the shock absorber arrangement 100. The following will describe the impact on the hysteresis effect when the shock absorber arrangement 100 is connected to the flexible bellows described above in relation to the description of FIG. 1.

Figure 4:
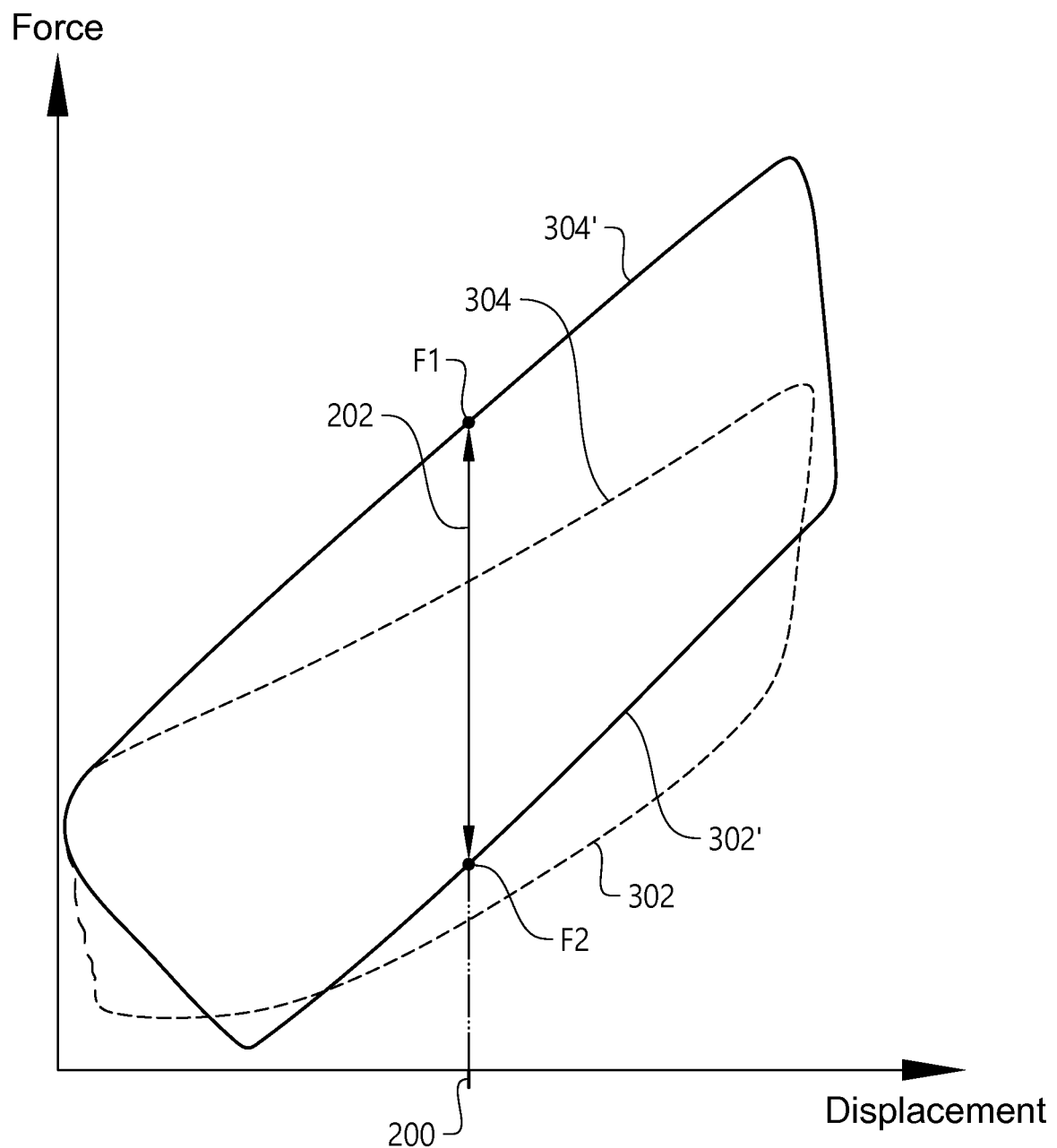
FIG. 4 is an example of a diagram of the load characteristics of a shock absorber connected to an air spring for two different air spring pressures.

The graph illustrated in FIG. 3 is depicted with dashed lines in FIG. 4 in order to simplify the illustration of the difference between the embodiment in FIG. 3 and the embodiment in FIG. 4. The force/displacement characteristic of the embodiment in FIG. 3 is representative for a first gas pressure level within the flexible bellows, while the force/displacement characteristic of the embodiment in FIG. 4 is representative for a second gas pressure level within the flexible bellows. It should be readily understood that the illustration in FIG. 4 is schematic and may take other form and shapes.

As can be seen in FIG. 4, the force characteristic of the shock absorber arrangement 100 differs from the force characteristic depicted in FIG. 3. In detail, the force gradient during both compression 304' and expansion 302' is steeper for the second gas pressure level in comparison to the corresponding force gradient during compression 304 and expansion 302 for the first gas pressure level.

As can be seen in FIG. 4, the difference 202 between the first F1 and second F2 values is higher for the second gas pressure level within the flexible bellows in comparison to the first gas pressure level. Hereby, when determining the predetermined energy dissipation range, the characteristic of the vehicle spring arrangement may be taken into account.

Figure 4B:
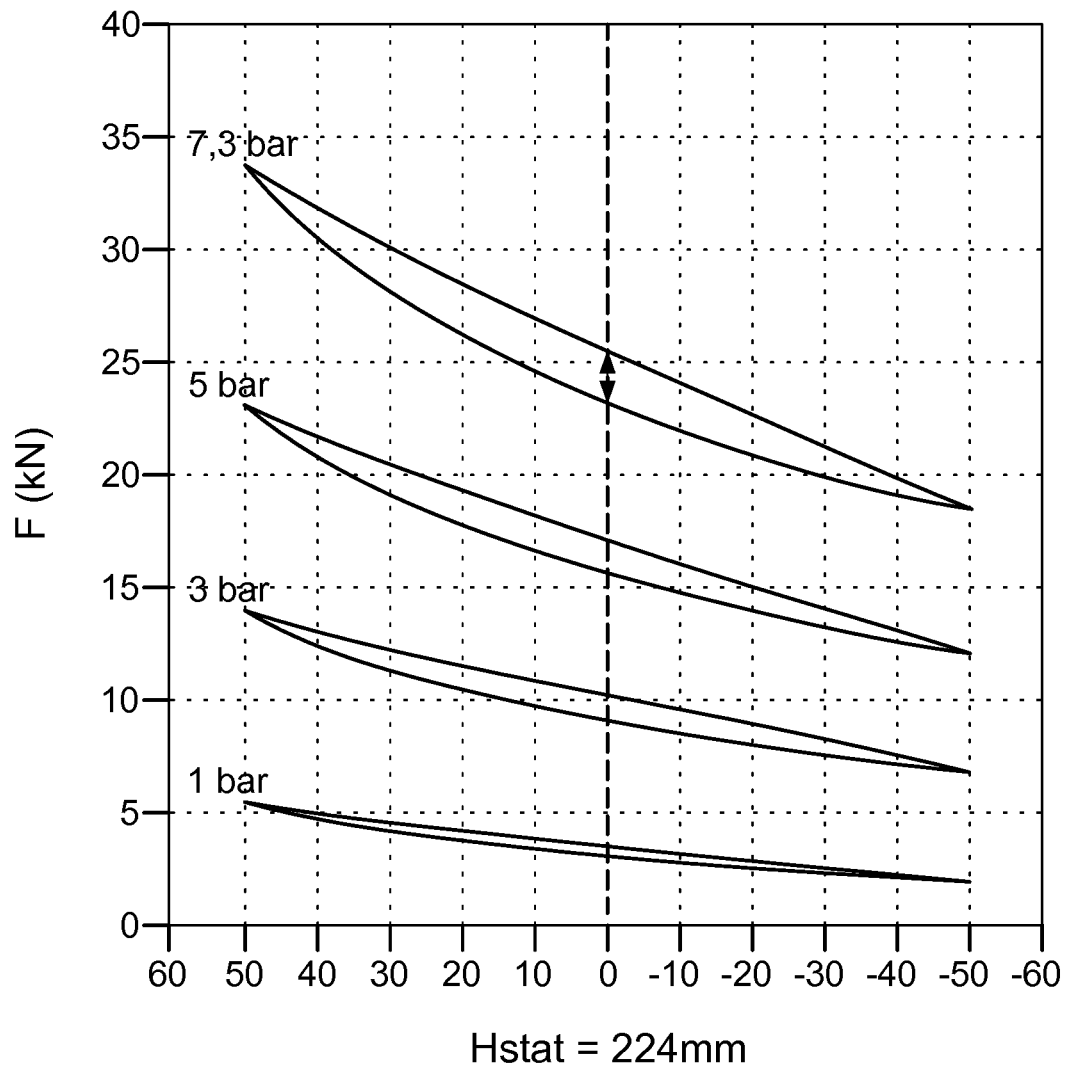
FIG. 4B is a diagram showing examples of different hysteresis curves of an air spring at different air spring pressures.

(In this context, FIG. 4B is an example of a diagram showing different hysteresis curves of an air spring (a flexible bellows) at different air spring pressures (gas pressure levels).)

Other aspect may also affect the hysteresis effect described above, such as the frequency of the oscillating force exposed to the shock absorber arrangement 100. In such situation, the predetermined energy dissipation range may be specific for such frequency level.

Still further, the shock absorber arrangement 100 is connected to the control unit 400 described above. According to the example depicted in FIG. 2, the control unit 400 is connected to a piston position sensor 120. The piston position sensor 120 is arranged to determine a position of the piston 101 relative the shock absorber housing 103. The piston position sensor 120 is depicted as connected to the piston 101. However, other alternatives of determining the position of the vehicle shock absorber arrangement 100 are of course conceivable. For example, the position of the vehicle shock absorber arrangement 100 can be determined by e.g. detecting the position of the vehicle frame 2 relative to the wheel axle 3, which can be determined by an external level sensor connected to e.g. the chassis of the vehicle.

The control unit 400 thus receives signals relating to the position of the vehicle shock absorber arrangement 100. The control unit may also preferably receive signals relating to the load exposed to the shock absorber arrangement 100 during operation thereof. This load may be acquired by detecting the acceleration levels exposed to the shock absorber arrangement 100. This may be achieved by use of e.g. a suitable sensor (not shown).

Figure 5:
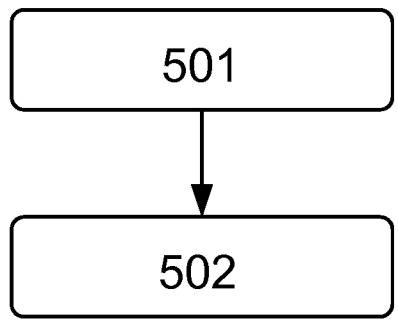
FIG. 5 is a schematic flow chart of an embodiment of a method for determining a desired speed of a vehicle.

With the above explanations relating to a specific example embodiment, reference is now made to FIG. 5 which is a flow chart of a method for determining a desired speed of a vehicle.

The method comprises
  obtaining 501, 601 a reference value indicative of the energy dissipated by the shock absorber arrangement 100 in a reference driving condition of a vehicle and
  determining 502, 602 a speed of the vehicle for which the value indicative of the energy dissipated by the shock absorber arrangement 100 in a similar driving condition is expected to fall within a predetermined energy dissipation range, using said reference value.

The step of obtaining 201, 601 a reference value indicative of the energy dissipated by the shock absorber arrangement 100 in a referencedriving condition of a vehicle, is thus not limited by the exemplary embodiments described in the above. The reference value indicative of the energy dissipated by the shock absorber arrangement should however be comparable to a predetermined energy dissipation range. In all, the method suggests determining a speed of the vehicle based on consideration of the energy dissipation in the shock absorber arrangement, which may be implemented in different manners.

Figure 6:
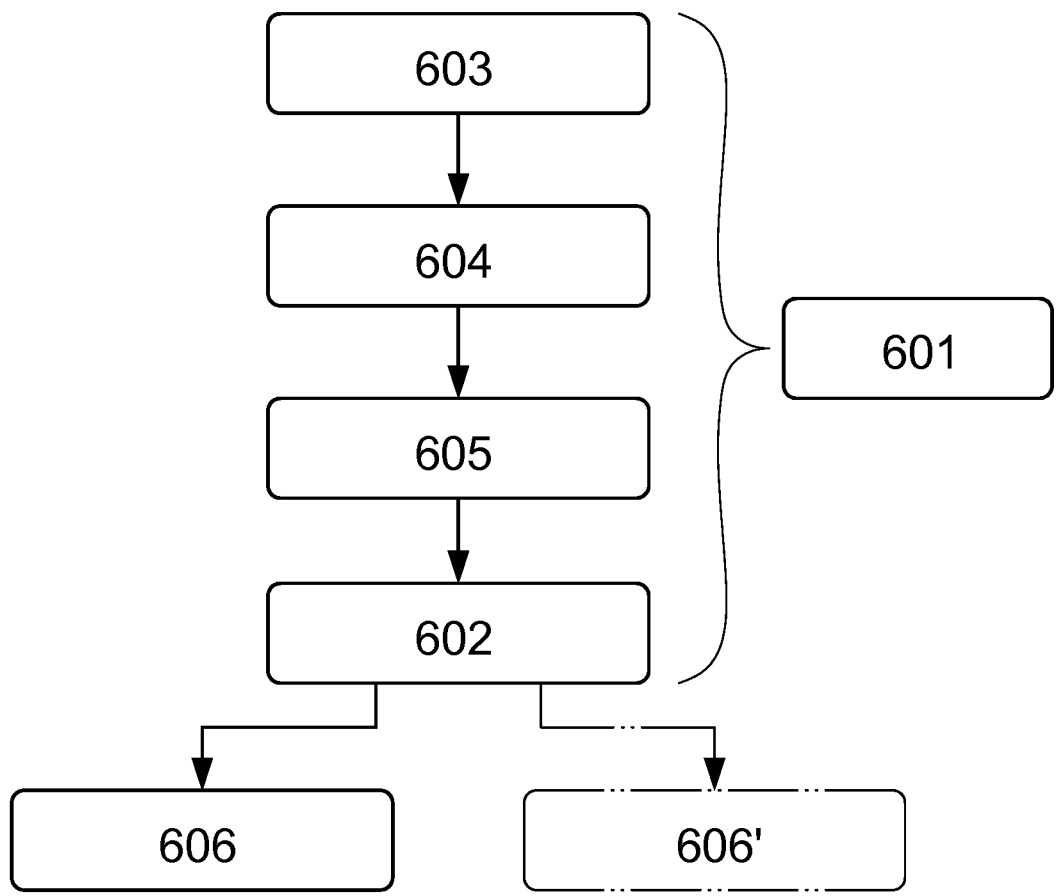
FIG. 6 is a schematic flow chart of embodiments of a method for determining a desired speed of a vehicle.

With reference to FIG. 6, in a variant of the method, obtaining 601 the value indicative of the energy dissipated by the shock absorber arrangement comprises
  determining 603 a first set of accelerations or loads for one or more displacements of the shock absorber arrangement when the shock absorber arrangement is compressed;
  determining 604 a second set of accelerations or loads for the one or more displacements of the shock absorber arrangement when the shock absorber arrangement is expanded; and
  determining 605 the value indicative of the energy dissipated by the shock absorber arrangement using a difference between the second set of accelerations or loads and/or displacements and the first set of accelerations or loads and/or displacements. See the above description with reference to FIGS. 2 to 4 for an example of an implementation.

Optionally, the step of obtaining 501, 601 a reference value indicative of the energy dissipated by the shock absorber arrangement in a reference driving condition of a vehicle, and the step of determining 502, 602 a speed of the vehicle such that the value indicative of the energy dissipated by the shock absorber arrangement in a similar driving condition falls within a predetermined energy dissipation range may be performed for one and the same vehicle. In this case, the determination of a speed of the vehicle may be based on a reference value indicative of the dissipated energy obtained immediately prior to said determination, meaning that the vehicle speed is adjusted based on events that have already occurred. Or, in other words, the reference value reflects the surface characteristics of a portion of the road already traveled. However, since it is indeed likely that a road surface displays similar surface characteristics over some extent of its length, the adjustment of the vehicle speed to the desired speed is likely to have an effect on the future impact perceived by the shock absorber arrangement.

Optionally, the step of obtaining 501, 601 a reference value indicative of the energy dissipated by the shock absorber arrangement in a reference driving condition of a vehicle is performed for a first vehicle, and the step of obtaining 502, 602 a speed of the vehicle such that the value indicative of the energy dissipated by the shock absorber arrangement in a similar driving condition falls within a predetermined energy dissipation range is performed for a second vehicle expected to travel along the same route as the first vehicle. In this case, the speed of the second vehicle may be adjusted so as to limit the energy dissipated by the shock absorber arrangement of the second vehicle based on the experiences of the first vehicle. The first vehicle may be a leading vehicle, and the second vehicle may be a trailing vehicle in a vehicle platoon. As such, the speed of the trailing vehicles may be adjusted so as to avoid detrimental impact also from intermittent variations of a road surface, such as e.g. a pothole.

The method may comprise giving 606 an indication of said determined speed to a driver of the vehicle. The indication may for example be a visual or audible indication, urging the driver to decrease a current driving speed. Alternatively, the indication may provide the driver with a speed value, to which the driver may adjust the driving speed.

In an autonomous or partly autonomous vehicle, the method may comprise controlling 606' the vehicle to said determined speed. The determined speed value may then be used as input to a speed control module of the vehicle.

As mentioned in the above, the shock absorber arrangement 2 may be connected to a vehicle spring arrangement. In this configuration, and with reference to FIG. 7, the method may further comprise a step 610 of determining the predetermined energy dissipation range comprising:
  obtaining 611 a characteristic of the vehicle spring arrangement, and
  determining 612 the predetermined energy dissipation range based on the characteristic of the vehicle spring arrangement.

Moreover, and as mentioned in the above, the method may further comprise a step 610 of determining the predetermined energy dissipation range comprising:
obtaining 621 a frequency level of the shock absorber arrangement 2; and determining 622 the predetermined energy dissipation range based on the frequency level.

Figure 7:
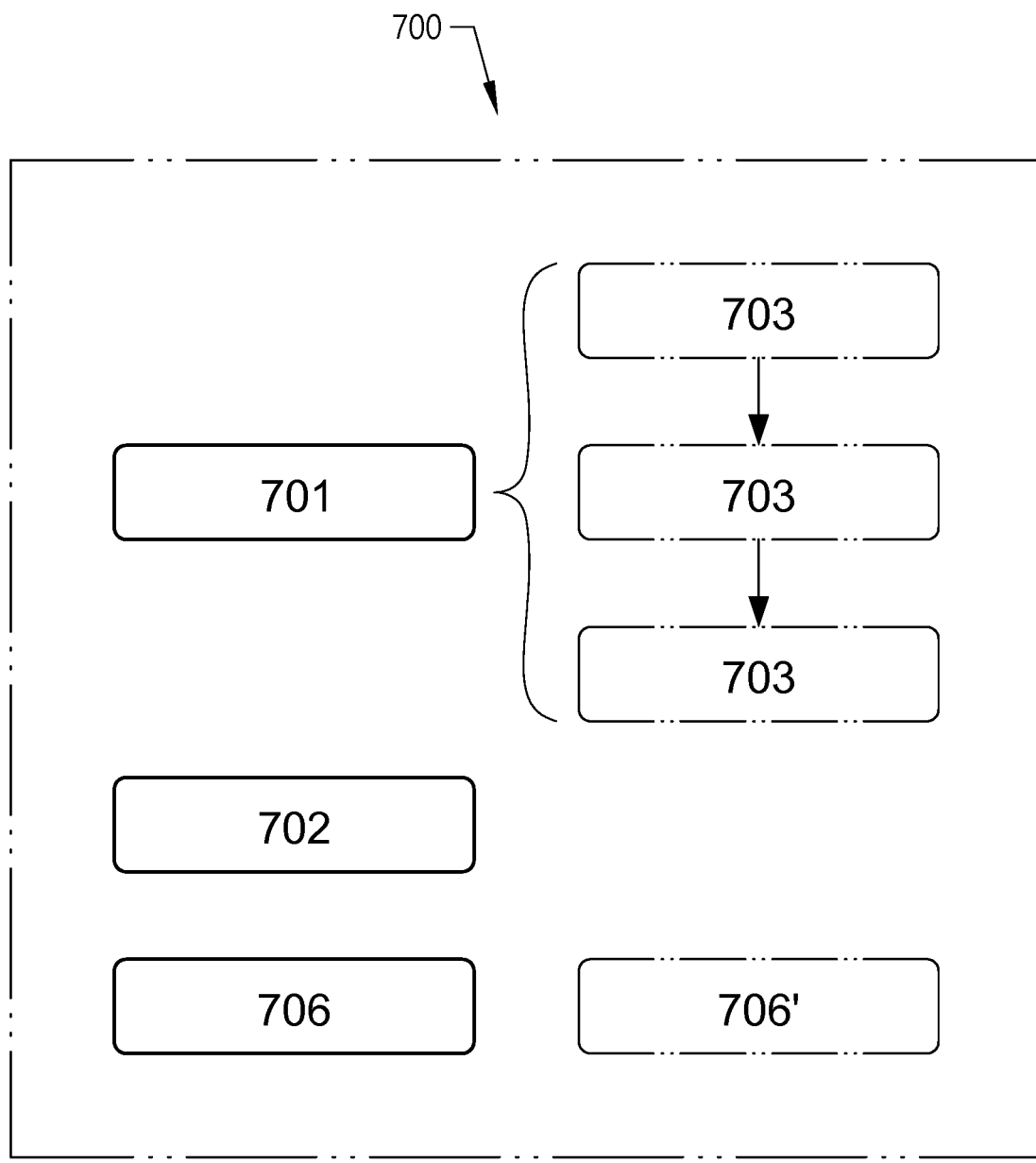
FIG. 7 is a schematic figure of an embodiment of a system for performing a method for determining a desired speed of a vehicle.

Also, as schematically illustrated in FIG. 7, a system 700 for determining a desired speed of a vehicle 1 is provided. The system is configured to
  obtain 701 a reference value indicative of the energy dissipated by the shock absorber arrangement in a reference driving condition of a vehicle and
  determine 702 a speed of the vehicle for which the value indicative of the energy dissipated by the shock absorber in a similar driving condition is expected to fall within a predetermined energy dissipation range.

The system may further be configured to obtain the value indicative of the energy dissipated by the shock absorber arrangement so as to
  determine 703 a first set of accelerations or loads for one or more predetermined displacements of the shock absorber when the shock absorber is compressed;
  determine 704 a second set of accelerations or loads for the one or more predetermined displacements of the shock absorber when the shock absorber is expanded; and
  determine 705 the value indicative of the energy dissipated by the shock absorber using a difference between the second set of accelerations or loads and/or displacements and the first set of accelerations or loads and/or displacements.

Moreover, the system may be configured to indicate 706 said determined speed to a driver of the vehicle, or alternatively further configured to control 706' the vehicle to said determined speed.

As exemplified in FIG. 7, the system may for example comprise an obtaining module 701, a determining module 702 and an indicating module 706 or a controlling module 706'. The obtaining module 701 may obtain information from one or more determining modules 703. Generally, the system may be connected to means for receiving data useful for the steps to be performed, for example data from sensors related to the shock absorber arrangement.

The system may advantageously comprise a control unit 400 as described in the above, configured to perform the steps and/or include the modules of the system.

It is to be understood that the present invention is not limited to the embodiments described above and illustrated in the drawings; rather, the skilled person will recognize that many changes and modifications may be made within the scope of the appended claims.

The invention claimed is:

1. A method for determining a desired speed of a vehicle, the vehicle comprising a shock absorber arrangement having an elastic hysteresis, the method comprising:
  obtaining, by a control unit, a reference value indicative of the energy dissipated by the shock absorber arrangement in a reference driving condition of a vehicle, under a load cycle by:
    determining, by the control unit, a first set of accelerations or loads that cause one or more displacements of the shock absorber arrangement when the shock absorber arrangement is compressed;
    determining, by the control unit, a second set of accelerations or loads that cause one or more displacements of the shock absorber arrangement when the shock absorber arrangement is expanded; and
    determining, by the control unit, the reference value indicative of the energy dissipated by the shock absorber arrangement using a difference between the second set of accelerations or loads that cause the one or more displacements of the shock absorber arrangement when the shock absorber arrangement is compressed and the first set of accelerations or loads that cause the one or more displacement of the shock absorber arrangement when the shock absorber arrangement is expanded; and
  determining, by the control unit, using said reference value, a speed of the vehicle such that the amount of energy dissipated by the shock absorber arrangement under the reference driving condition is within a predetermined energy dissipation range.

2. The method of claim 1, wherein:
obtaining the reference value indicative of the energy dissipated by the shock absorber arrangement in the reference driving condition of the vehicle is performed for a first vehicle, and
determining the speed of the vehicle using the reference value is performed for a second vehicle expected to travel along the same route as the first vehicle, wherein the first vehicle is a leading vehicle and the second vehicle is a trailing vehicle in a vehicle platoon.

3. The method of claim 1, wherein obtaining the reference value and determining the speed of the vehicle are performed for the same vehicle.

4. The method of claim 1, further comprising giving, by the control unit, an indication of said determined speed to a driver of the vehicle.

5. The method of claim 1, further comprising controlling, by the control unit, the vehicle to said determined speed.

6. The method of claim 1, wherein the shock absorber arrangement is connected to a vehicle spring arrangement of the vehicle, wherein the method further comprises determining the predetermined energy dissipation range comprising:
- obtaining, by the control unit, a characteristic of the vehicle spring arrangement, and
- determining, by the control unit, the predetermined energy dissipation range based on the characteristic of the vehicle spring arrangement.

7. The method of claim 1, further comprising determining the predetermined energy dissipation range comprising:
- obtaining, by the control unit, a frequency level of the shock absorber arrangement; and
- determining, by the control unit, the predetermined energy dissipation range based on the frequency level.

8. A system for determining a desired speed of a vehicle, the vehicle comprising a shock absorber arrangement having an elastic hysteresis, the system being configured to:
- obtain, by a control unit, a reference value indicative of the energy dissipated by the shock absorber arrangement in a reference driving condition of a vehicle, under a load cycle by:
  - determining, by the control unit, a first set of accelerations or loads that cause one or more displacements of the shock absorber arrangement when the shock absorber arrangement is compressed;
  - determining, by the control unit, a second set of accelerations or loads for that cause the one or more displacements of the shock absorber arrangement when the shock absorber arrangement is expanded; and
  - determining, by the control unit, the reference value indicative of the energy dissipated by the shock absorber arrangement using a difference between the second set of accelerations or loads that cause the one or more displacements of the shock absorber arrangement when the shock absorber arrangement is compressed and the first set of accelerations or loads that cause the one or more displacement of the shock absorber arrangement when the shock absorber arrangement is expanded; and
- determining, by the control unit, using said reference value, a speed of the vehicle such that the amount of energy dissipated by the shock absorber arrangement under the reference driving condition is within a predetermined energy dissipation range.

9. The system of claim 8, further configured to at least one of:
- indicate, by the control unit, said determined speed to a driver of the vehicle, or control, by the control unit, the vehicle to said determined speed.

10. A vehicle comprising a system, the vehicle comprising a shock absorber arrangement having an elastic hysteresis, the system being configured to:
- obtain, by a control unit, a reference value indicative of the energy dissipated by the shock absorber arrangement in a reference driving condition of a vehicle, under a load cycle by:
  - determining, by the control unit, a first set of accelerations or loads that cause one or more displacements of the shock absorber arrangement when the shock absorber arrangement is compressed;
  - determining, by the control unit, a second set of accelerations or loads that cause the one or more displacements of the shock absorber arrangement when the shock absorber arrangement is expanded; and
  - determining, by the control unit, the reference value indicative of the energy dissipated by the shock absorber arrangement using a difference between the second set of accelerations or loads that cause the one or more displacements of the shock absorber arrangement when the shock absorber arrangement is compressed and the first set of accelerations or loads that cause the one or more displacement of the shock absorber arrangement when the shock absorber arrangement is expanded; and
- determining, by the control unit, using said reference value, a speed of the vehicle such that the amount of energy dissipated by the shock absorber arrangement under the reference driving condition is within a predetermined energy dissipation range.

* * * * *